United States Patent [19]
Yatsuzuka

[11] Patent Number: 5,266,750
[45] Date of Patent: Nov. 30, 1993

[54] TABLET INPUT DEVICE

[75] Inventor: Yasufumi Yatsuzuka, Kashihara, Japan

[73] Assignee: Sharp Kabushiki Kaisha, Osaka, Japan

[21] Appl. No.: 889,376

[22] Filed: May 28, 1992

[30] Foreign Application Priority Data

May 30, 1991 [JP] Japan .................. 3-127693

[51] Int. Cl.$^5$ .............................. G08C 21/00
[52] U.S. Cl. ...................... 178/19; 178/18; 345/174
[58] Field of Search ............ 178/18, 19, 20, 57; 340/712

[56] References Cited

U.S. PATENT DOCUMENTS

| | | | |
|---|---|---|---|
| 4,570,149 | 2/1986 | Thornburg et al. | 178/18 X |
| 4,575,580 | 3/1986 | Jandrell | 178/18 |
| 4,672,358 | 6/1987 | Beches et al. | 340/712 X |

FOREIGN PATENT DOCUMENTS 54-50227 4/1979 Japan .
61-54524 3/1986 Japan .

*Primary Examiner*—Curtis Kuntz
*Assistant Examiner*—Paul Loomis
*Attorney, Agent, or Firm*—Nixon & Vanderhye

[57] ABSTRACT

It is so constructed that the current flowing during the input waiting period is reduced. A pull-down resistor is connected to one electrode of X-axis electrodes. A diode is connected to one electrode of Y-axis electrodes along the Y-axis electrode direction. During the input waiting period, the anode terminal of the diode is set to a high level. The detection of the voltage variation of the X-axis electrode to which the resistor is connected is performed during the input waiting period. When the voltage variation is detected, the operation of detecting a position is started.

4 Claims, 3 Drawing Sheets

TABLET INPUT DEVICE

BACKGROUND OF THE INVENTION

1. Field of the Invention

The present invention relates to a tablet input device of the resistance film type.

2. Description of the Related Art

FIG. 1 illustrates a prior art tablet input device. In the figure, 11 designates a transparent input tablet consisting of two stacked rectangular resistance layers 11X and 11Y in each of which a transparent resistance material such as indium oxide is applied to form a transparent resistance film. One of the resistance layers, the layer 11X is used as an X-axis tablet, and X-axis electrodes a12 and a13 are respectively formed on the side of the X-axis tablet. The other of the resistance layers, the layer 11Y is used as a Y-axis tablet, and Y-axis electrodes a11 and a14 are respectively formed on the sides of the Y-axis tablet. Driving transistors Tr2a and Tr3a are respectively connected to the X-axis electrodes a12 and a13, and transistors Tr1a and Tr4a to the Y-axis electrodes a11 and a14.

In this tablet input device, the transistors Tr1a and Tr2a are kept in the ON state during an input waiting state, and when an any point of the tablet face is pressed the voltage level of the electrode a12 changes. The timing of this level change functions as a trigger to start an operation of detecting a position.

In the tablet input device having the above-described configuration, since the two transistors Tr1a and Tr2a are required to be kept in the driven state during the input waiting state, with the result that a relatively large power is consumed. In the even that such a tablet input device is applied to a small electronic apparatus, its current consumption considerably affects the life of an battery used in the apparatus. In order reduce the power consumption, FETs (field effect transistors) may be used as the switching elements. However, FETs have generally a high driving voltage, and therefore it is difficult to design a practical circuit.

SUMMARY OF THE INVENTION

It is an object of the invention to reduce the current flowing during an input waiting period.

The invention is characterized in that the tablet input device comprises:

an input tablet having an X-axis tablet in which X-axis electrodes are formed on both sides of an X-axis of a rectangular resistance layer, and a Y-axis tablet in which Y-axis electrodes are formed on both sides of a Y-axis of a rectangular resistance layer, the X-axis tablet and the Y-axis tablet being in a superposed relation;

switching elements respectively connected to the X-axis and Y-axis electrodes;

a pull-down resistor connected one of the X-axis electrodes;

a diode connected one of the Y-axis electrodes along the Y-axis electrode direction;

means for, during the input waiting period, setting the anode side of the diode to a high level; and position detecting means for, during the input waiting period, detecting a voltage variation of the X-axis electrode to which the resistor is connected, and for, when a voltage variation is detected, starting an operation of detecting a position.

A pull-down resistor is connected to one of the X-axis electrodes, a diode is connected to one of the Y-axis electrodes along the Y-axis electrode direction, and during the input waiting period the anode of the diode is set to a high level. Under this condition, unlike the prior art, the switching elements are never in the ON state. When the tablet face is pressed, the upper and lower tablets are made in contact at the pressed point, with the result that a very weak current flows toward the resistor through the diode. This current flow generates a voltage appearing across the resistor. By detecting this voltage, it is detected that the tablet face has been pressed, and the operation of detecting the position is started.

According to the invention, it is not necessary to keep the switching elements for driving the tablets in the ON state, whereby the power consumption is remarkably reduced as compared with the prior art.

In another aspect of the invention, a tablet input device according to the invention comprises:

an input tablet in which an X-axis direction and a Y-axis direction are defined, the X-axis and Y-axis directions being perpendicular to each other, and which has two resistance sheets each having a resistance film formed on a surface, the surfaces of the two resistance sheets facing to each other, a pair of X-axis electrodes being formed on the resistance film at the both sides which are opposed to each other in the X-axis direction of one of the resistance sheets, a pair of Y-axis electrodes being formed on the resistance film at the both sides which are opposed to each other in the Y-axis direction of the other of the resistance sheets;

switching elements respectively connected to the X-axis and Y-axis electrodes;

a pull-down resistor connected to one of the paired electrodes formed on one of the two resistance sheets;

a diode, the cathode of the diode being connected to one of the paired electrodes formed on the resistance sheet to which the resistor is not connected;

means for, during the input waiting period, setting the switching elements to be in the OFF state and the anode side of the diode to a high level; and position detecting means for, during the input waiting period, detecting a voltage variation of the electrode to which the resistor is connected, and for, after a voltage variation is detected, starting an operation of detecting a position.

The invention is characterized in that the position detecting means, during the input waiting period, detects that the input tablet is pressed by detecting a voltage generating across the resistor, the voltage is generated by contacting resistance layers each other by pressing the input tablet and flowing a current toward the register through the diode, and starts the operation of detecting the position.

BRIEF DESCRIPTION OF THE DRAWINGS

Other and further objects, features, and advantages of the invention will be more explicit from the following detailed description taken with reference to the drawings wherein.

DESCRIPTION OF THE PREFERRED EMBODIMENTS

Figure 1:
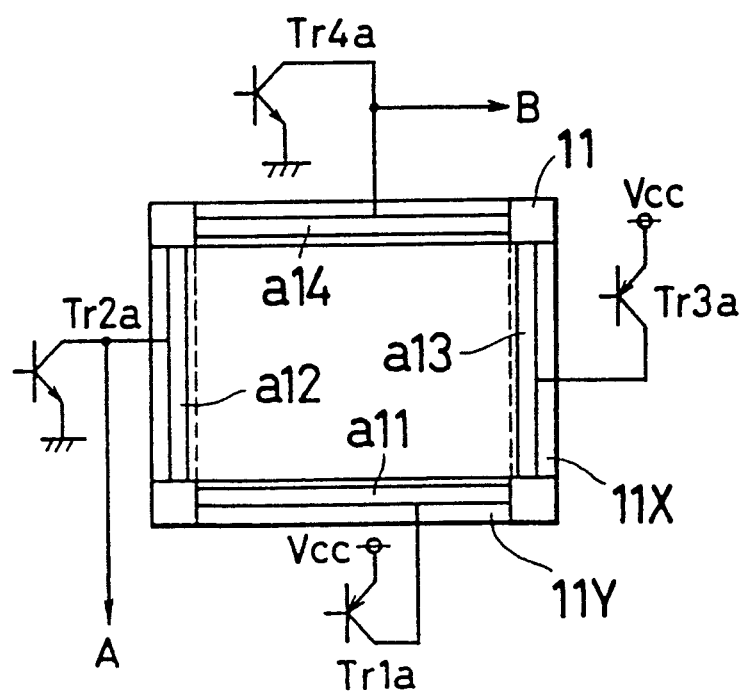
FIG. 1 is a diagram of a prior art tablet input device.

Now referring to the drawing, preferred embodiments of the invention are described below.

Figure 2:
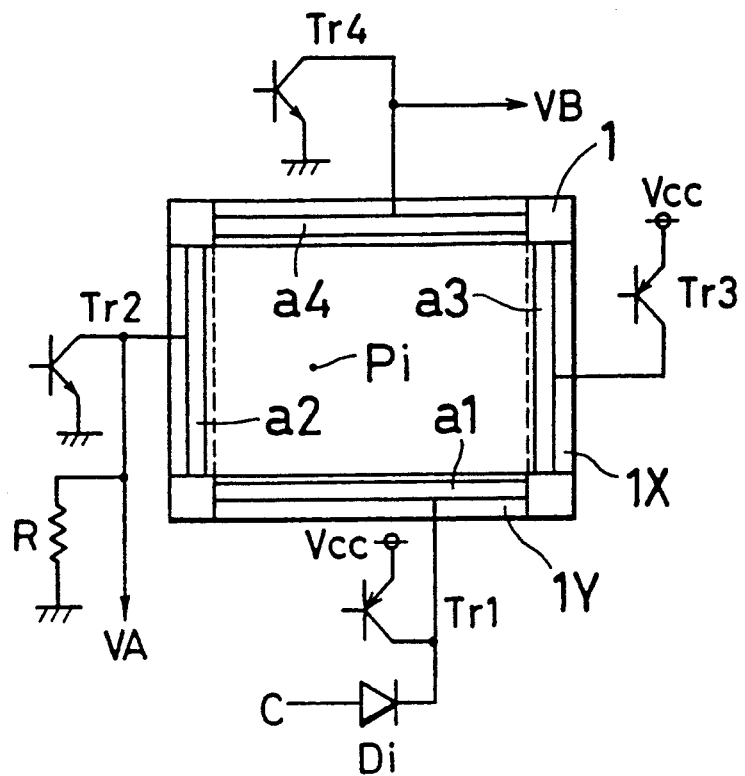
FIG. 2 is a diagram illustrating the configuration of an embodiment of the invention.

FIG. 2 illustrates a diagram of a tablet input device which is an embodiment of the invention.

An tablet input device 1 is constructed by stacking two rectangular resistance sheets 1X and 1Y in each of which a transparent resistance material such as indium oxide is applied to form a transparent resistance film, so that these transparent resistance films oppose to each other. At least one of the resistance sheets 1X and 1Y is flexible. The resistance sheet 1X is used as an X-axis tablet, and the resistance sheet 1Y as a Y-axis tablet. In the description, it is assumed that the X-axis elongates in the rightward and leftward directions in FIG. 2 and the Y-axis in the upward and downward directions. X-axis electrodes a2 and a3 are respectively formed in the both ends of the resistance sheet 1X which oppose to each other in the X-axis direction, and Y-axis electrodes a1 and a4 are respectively formed in the both ends of the resistance sheet 1Y which oppose to each other in the Y-axis direction. The two resistance sheets 1X and 1Y are slightly spaced from each other by a spacer or the like, so that they are in a non-contacting state when a pen, finger or the like is not placed on the resistance sheet 1X which is flexible and constitutes a pressure face.

Driving transistors Tr2 and Tr3 are respectively connected to the X-axis electrodes a2 and a3, and driving transistors Tr1 and Tr4 to the Y-axis electrodes a1 and a4. The transistors Tr1 and Tr3 are supplied with a constant voltage Vcc, while the transistors Tr2 and Tr4 are grounded. Therefore, by adequately controlling the ON/OFF states of these transistors Tr1–Tr4, the electrodes a2 and a4 are changed from a low level (ground level) state to a high-impedance state and vice versa, and the electrodes a1 and a3 are changed from a high level (potential Vcc) state to a high-impedance state and vice versa.

Accordingly, it is possible to set the electrodes a2 and a3 to the high-impedance state so that the sheet resistance of the resistance sheet 1X is in a high-impedance state. Alternatively it is also possible to set the electrode a2 to the low level and the electrode a3 to the high level so that the sheet resistance of the resistance sheet 1X has a gradient potential. These are similarly applicable to the electrodes a1 and a4.

It is supposed that in the tablet input device 1 the resistance sheet 1X makes point contact with the resistance sheet 1Y at a pressed point Pi. When, under this situation, both the switching elements Tr2 and Tr3 are turned ON so that the electrode a2 is at the low level (ground level) and the electrode a3 at the high level (Vcc), and both the switching elements Tr1 and Tr4 are turned OFF to be in the high-impedance state, the potential of the electrode a4 is equal to that of the contact point Pi. When the resistance from the electrode a2 to the contact point Pi is Rx1 and the resistance from the contact point Pi to the electrode a3 is Rx2, the potential of the contact point Pi has the value obtained by dividing the potential Vcc into Rx1:Rx2. Using this value, the X-coordinate of the contact point Pi can be calculated.

Then, both the switching elements Tr1 and Tr4 are turned ON so that the electrode a4 is at the low level (ground level) and the electrode a1 at the high level (Vcc), and both the switching elements Tr2 and Tr3 are turned OFF to be in the high-impedance state, the potential of the electrode a2 is equal to that of the contact point Pi. When the resistance from the electrode a4 to the contact point Pi is Ry1 and the resistance from the contact point Pi to the electrode a1 is Ry2, the potential of the contact point Pi has the value obtained by dividing the potential Vcc into Ry1:Ry2. Using this value, the Y-coordinate of the contact point Pi can be calculated.

The tablet input device having the above-described configuration differs from the prior art device of FIG. 1 in that a pull-down resistor R is connected to the X-axis electrode a2 and a diode Di to the Y-axis electrode a1 along of the direction of the electrode a1, namely a cathode of the diode Di is connected to the Y-axis electrode a1.

Figure 3:
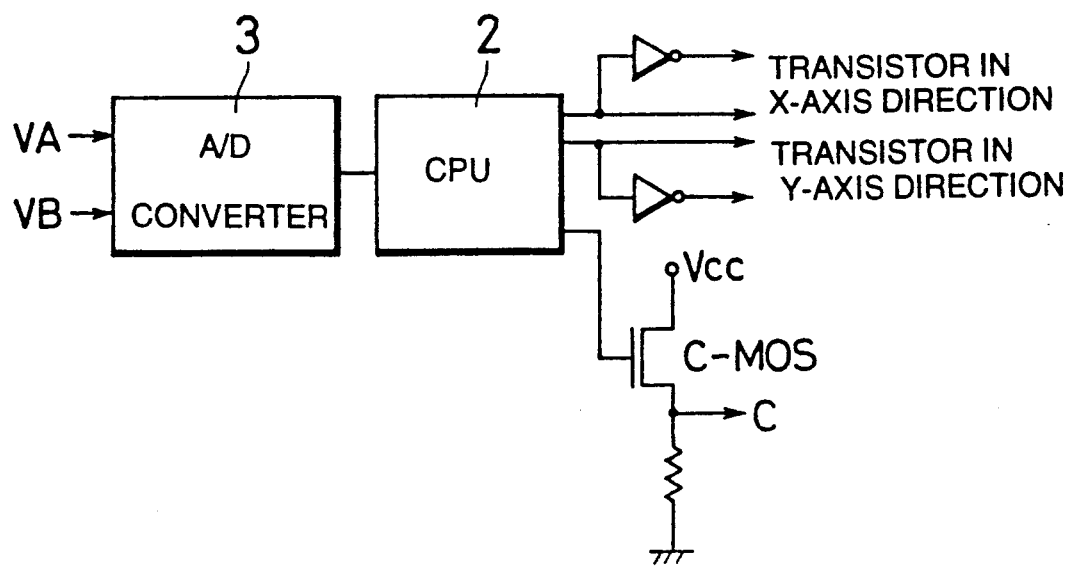
FIG. 3 is a diagram of an control unit.

FIG. 3 is a block diagram of a control unit which is connected to the tablet input device. A CPU 2 generates a control signal for driving the transistors Tr2 and Tr3 in the X-axis direction, another control signal for driving the transistors Tr1 and Tr4 in the Y-axis direction, and a further control signal for setting the anode terminal c of the diode Di to a high level through a C-MOS (complementary metal oxide semiconductor) transistor. At the input port of the CPU 2, connected is an A/D (analog-to-digital) converter 3 to which the voltage VA of the electrode a2 in the X-axis direction and the voltage VB of the electrode a4 in the Y-axis direction are input.

Figure 4:
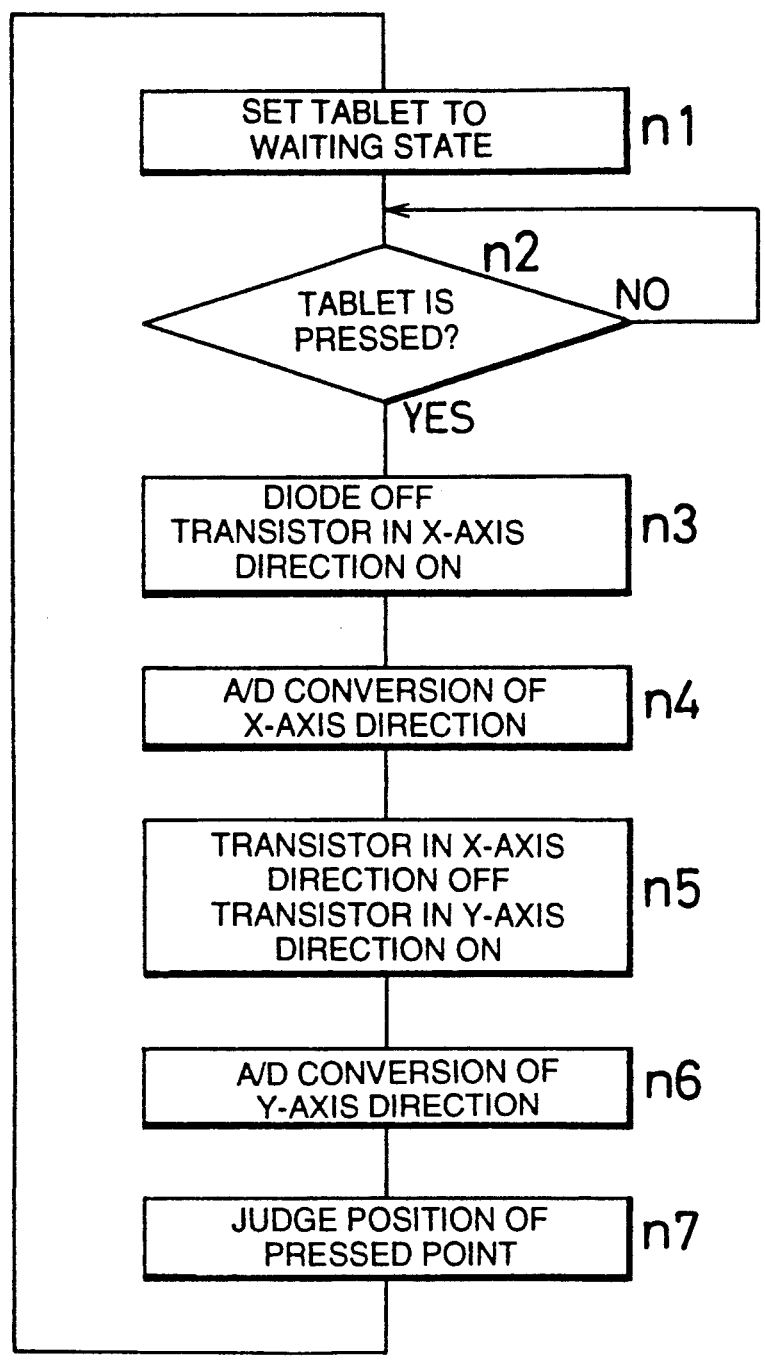
FIG. 4 is a flowchart illustrating the operation of a CPU.

The operation of the tablet input device will be described with reference to FIG. 4 which is a flowchart illustrating the control of the CPU 2.

Firstly, the entire of the tablet is set to the input wait state (step n1). At this time, the CPU 2 sets the anode terminal c of the diode Di to "H" level, and the transistors Tr1–Tr4 to the OFF state. Under this condition, the voltage VA is pulled down to "L" level by the resistor R.

In this input waiting state, the whole surface of the Y-axis tablet is set to "H" level by the diode Di, and the whole surface of the X-axis tablet is set to "L" level by the resistor R. When the X-axis tablet is pressed downward under this condition, the X-axis tablet is made in contact with the Y-axis tablet at the pressed point, resulting in that the X-axis tablet which has been set to "L" level by the resistor R is pulled up to "H" level of the Y-axis tablet. That is, the voltage VA changes from "L" level to "H" level. This voltage level change is detected in step n2. Although this voltage level change detection can be performed by detecting either the edge or the level of the voltage-changing signal, it may be done by the combination of the edge detection and the level detection. According to this combined detection, it is possible to improve the detection accuracy.

When it is detected that the X-axis tablet is pressed, in step n3, the anode terminal c of the diode Di is set to "L" level and the transistors Tr2 and Tr3 in the X-axis direction are simultaneously turned ON. Since the level of the voltage VB correlates with the position in the X-axis direction, the position in the X-axis direction of the pressed point is obtained in step n4 by subjecting the level of the voltage VB to the analog-to-digital conversion. Then, the transistors Tr2 and Tr3 in the X-axis direction are turned OFF and the transistors Tr1 and Tr4 in the Y-axis direction are turned ON. Since the level of the voltage VA correlates with the position in the Y-axis direction, the position in the Y-axis direction of the pressed point is obtained by subjecting the level of the voltage VA to the analog-to-digital conversion (step n6). After the processes of steps n3–n6 have been done, the position of the pressed point is judged in step n7, and the tablet input device returns to the initial state, that is, the input wait state (step n1).

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description and all changes which come within the meaning and the range of equivalency of the claims are therefore intended to be embraced therein.

What is claimed is:

1. A tablet input device comprising:
an input tablet having an X-axis tablet in which X-axis electrodes are formed on both sides of an X-axis of a rectangular resistance layer, and a Y-axis tablet in which Y-axis electrodes are formed on both sides of a Y-axis of a rectangular resistance layer, the X-axis tablet and the Y-axis tablet being in a superposed relation;
switching elements respectively connected to the X-axis and Y-axis electrodes;
a pull-down resistor connected to one of the X-axis electrodes;
a diode connected to one of the Y-axis electrodes along the Y-axis electrode direction;
means for, during a waiting period, setting the anode side of the diode to a high level; and
means for, during a waiting period, detecting a voltage variation of the X-axis electrode to which the resistor is connected, and for, when a voltage variation is detected, starting an operation of detecting a position.

2. A tablet input device comprising:
an input tablet in which an X-axis direction and a Y-axis direction are defined, the X-axis and Y-axis directions being perpendicular to each other, and which has two resistance sheets each having a resistance film formed on a surface, the surfaces of the two resistance sheets facing to each other, a pair of X-axis electrodes being formed on the resistance film at the both sides which are opposed to each other in the X-axis direction of one of the resistance sheets, a pair of Y-axis electrodes being formed on the resistance film at the both sides which are opposed to each other in the Y-axis direction of the other of the resistance sheets;
switching elements respectively connected to the X-axis and Y-axis electrodes;
a pull-down resistor connected to one of the paired electrodes formed on one of the two resistance sheets;
a diode, the cathode of the diode being connected to one of the paired electrodes formed on the resistance sheet to which the resistor is not connected;
means for, during a waiting period, setting the switching elements to be in the OFF state and the anode side of the diode to a high level; and
means for, during the input waiting period, detecting a voltage variation of the electrode to which the resistor is connected, and for, after a voltage variation is detected, starting an operation of detecting a position.

3. A tablet input device comprising according to claim 1 wherein: the position detecting means, during the input waiting period, detects that the input tablet is pressed by detecting a voltage generating across the resistor, the voltage is generated by contacting resistance layers each other by pressing the input tablet and flowing a current toward the resistor through the diode, and starts the operation of detecting the position.

4. A tablet input device comprising according to claim 2 wherein: the position detecting means, during the input waiting period, detects that the input tablet is pressed by detecting a voltage generating across the resistor, the voltage is generated by contacting resistance layers each other by pressing the input tablet and flowing a current toward the resistor through the diode, and starts the operation of detecting the position. d

* * * * *